(12) United States Patent
Galivel

(10) Patent No.: US 8,497,676 B2
(45) Date of Patent: Jul. 30, 2013

(54) METHOD AND SYSTEM FOR DETERMINING THE ANGULAR POSITION OF A TURBOJET ENGINE ROTOR

(75) Inventor: Jean-Pierre Galivel, Savigny le Temple (FR)

(73) Assignee: SNECMA, Paris (FR)

( * ) Notice: Subject to any disclaimer, the term of this patent is extended or adjusted under 35 U.S.C. 154(b) by 358 days.

(21) Appl. No.: 13/000,858

(22) PCT Filed: Jun. 18, 2009

(86) PCT No.: PCT/FR2009/051158
§ 371 (c)(1),
(2), (4) Date: Dec. 22, 2010

(87) PCT Pub. No.: WO2010/007277
PCT Pub. Date: Jan. 21, 2010

(65) Prior Publication Data
US 2011/0109305 A1    May 12, 2011

(30) Foreign Application Priority Data
Jun. 23, 2008  (FR) ...................................... 08 54118

(51) Int. Cl.
*G01B 7/30* (2006.01)
(52) U.S. Cl.
USPC ................................................. 324/207.25
(58) Field of Classification Search
USPC ................................................... 324/207.25
See application file for complete search history.

(56) References Cited

U.S. PATENT DOCUMENTS

| 5,258,923 | A | 11/1993 | Imam et al. |
| 6,098,022 | A | 8/2000 | Sonnichsen et al. |
| 6,456,945 | B1 | 9/2002 | Sonnichsen et al. |
| 6,505,143 | B1 | 1/2003 | Lakshminarasimha et al. |
| 2007/0038392 | A1 | 2/2007 | Iyer et al. |

FOREIGN PATENT DOCUMENTS

| EP | 1 118 920 | 7/2001 |
| EP | 1 752 754 | 2/2007 |
| GB | 2 208 548 | 4/1989 |
| GB | 2 319 812 | 6/1998 |

OTHER PUBLICATIONS

International Search Report issued Dec. 9, 2009 in PCT/FR09/051158 filed Jun. 18, 2009.

*Primary Examiner* — Reena Aurora
(74) *Attorney, Agent, or Firm* — Oblon, Spivak, McClelland, Maier & Neustadt, L.L.P.

(57) ABSTRACT

A method of determining the angular position of a first rotor of a turbojet. A vibration pulse is generated during a rotation of the first rotor, each vibration pulse being generated when the first rotor passes through a given reference angular position. The vibration generated is detected. The angular position is obtained at a given instant of a second rotor of the turbojet relative to the angular position that it occupied at a reference instant representative of detecting a vibration pulse. The second rotor is coupled in rotation with the first rotor and has a speed of rotation different from the speed of rotation thereof. The angular position of the first rotor at the given instant is determined from the angular position of the second rotor.

10 Claims, 4 Drawing Sheets

METHOD AND SYSTEM FOR DETERMINING THE ANGULAR POSITION OF A TURBOJET ENGINE ROTOR

BACKGROUND OF THE INVENTION

The invention relates to monitoring airplane engines and more particularly gas turbine airplane engines. A preferred but non-limiting particular application of the invention lies in monitoring two-spool turbojets.

Monitoring the operation of an engine serves advantageously to anticipate engine stoppages associated with component failure. It also serves to prepare maintenance operations on the engine, given knowledge in advance of the problems that need to be solved.

In conventional manner, such monitoring relies on processing signals recorded by sensors sensing the operation of the engine, e.g. sensors such as vibration, speed, temperature, or pressure sensors. As a function of the characteristics of the engine and of the monitored members, it is possible to identify the beginning of a component failure and to program maintenance action on that component before its failure is complete and leads to the engine stopping.

In particular with two-spool turbojets, it can also be useful to know the angular positions of the various rotors of the turbojet (e.g. rotary shafts), in order to perform more accurate analysis of identified failures (e.g. changes in a blade of a rotor presenting unbalance).

For this purpose, it is known to use a speed sensor fitted with a toothed wheel secured to the rotor and provided with a tooth that is different from the others. By way of example, such a wheel is described in document EP 1 777 526. The different tooth of the toothed wheel generates a signal that is different from the signal generated by the other teeth, thus making it possible to identify the angular position of the rotor at instants when said signal is detected by the speed sensor.

Nevertheless, in order to determine the angular position of a rotor in this way by analyzing signals measured by such a speed sensor, it is necessary for signal measurement to be performed directly on the rotor for which it is desired to know the angular position.

Although it is easy to position the speed sensor fitted with a toothed wheel on a shaft of a low pressure rotor in a two-spool turbojet, the same is not true for the shaft of the high pressure rotor of said turbojet since it is difficult to access that shaft. Installing a speed sensor fitted with a toothed wheel on a shaft of a high pressure rotor would then require having recourse to devices that are complex and expensive, such as for example the device described in document U.S. Pat. No. 4,075,562, where such a device is difficult to incorporate in the context of a set of multiple rotors.

OBJECT AND SUMMARY OF THE INVENTION

A main object of the present invention is thus to mitigate the above-mentioned drawbacks. For this purpose, the invention provides a method of determining the angular position of a first rotor of a turbojet, the method consisting in:

generating at least one vibration pulse during a rotation of the first rotor, each vibration pulse being generated when the first rotor passes through a given reference angular position;

detecting the vibration generated thereby;

obtaining the angular position at a given instant of a second rotor of the turbojet relative to the angular position that it occupied at a reference instant representative of detecting a vibration pulse, said second rotor being coupled in rotation with the first rotor and having a speed of rotation different from the speed of rotation thereof; and determining from the angular position of the second rotor, the angular position of the first rotor at said given instant.

Correspondingly, the invention also provides a system for determining the angular position of a first turbojet rotor, the system being characterized in that it comprises:

means for generating vibration during a rotation of the first rotor, each vibration pulse being generated on the first rotor passing through a given reference angular position;

means for detecting the generated vibration pulses;

means for obtaining the annular position at a given instant of a second rotor of the turbojet relative to the angular position it occupied at a reference instant representative of a vibration pulse being detected, said second rotor being coupled to rotate with said first rotor and having a speed of rotation that is different from the speed of rotation thereof; and means for determining the angular position of the first rotor at said given instant on the basis of the angular position of the second rotor.

The invention thus makes it possible to determine the angular position of a rotor without requiring complex implementation of a device such as a speed sensor fitted with a toothed wheel on a rotor that is difficult to access.

The invention is thus particularly advantageous when it is desired to know the angular position of the high pressure shaft of a two-spool turbojet at a given instant. By way of example, it is then possible, on the basis of the angular position at a given instant of a shaft of an accessory gearbox (the second rotor in the meaning of the invention) that is constrained to rotate with the high pressure shaft, to obtain the angular position of the high pressure shaft at said instant.

In an advantageous implementation of the invention, the angular position of the second rotor is obtained from a signal delivered by a sensor and representative of the teeth of a toothed wheel that is positioned on the second rotor going past the sensor.

By way of example, it is possible to select the instant representative of detecting a vibration pulse as an instant at which the passage of the first rotor through the reference position coincides with a tooth of the toothed wheel going past the sensor.

By means of the invention, the angular position of a rotor of the turbojet can be known at all instants. It is thus possible to associate some particular event, e.g. the detection of unbalance at a given instant, with the angular position of the rotor at that instant, thus making it possible to perform more accurate analysis of identified failures.

The invention thus also provides a method of determining the angular position of an unbalance that is detected at a given instant on a first rotor of a turbojet, the turbojet also including a second rotor coupled in rotation with the first rotor and having a speed of rotation that is different from the speed of rotation thereof. In accordance with the invention, the method of determining the angular position of an unbalance consists in:

determining the angular position of the first rotor at the instant at which the unbalance was detected, as a function of the angular position of the second rotor by using a method of determining angular position as mentioned above; and determining the angular position of the unbalance at said instant from the angular position of the first rotor.

In very advantageous manner, in order to detect the vibration pulse(s) generated, it is possible to use vibration sensors that are already present in the turbojet (e.g. for monitoring the turbojet), providing these sensors possess parameters that enable them to detect the vibration pulses generated in accordance with the invention.

The invention thus advantageously makes use of equipment that already exists within a turbojet. There is no need to fit the turbojet with additional means for detecting the vibration signals.

In a particularly advantageous embodiment of the invention, the means for generating vibration are adapted to cease generating vibration on the first rotor passing through the reference angular position as from a particular speed of operation of the turbojet.

Thus, the vibration generator means are active only during a limited period of time, e.g. when the turbojet is operating at low speed. As a result, wear of the vibration generator means is avoided and a fortiori the faults resulting from such wear are avoided.

By way of example, the means for generating vibration may comprise a projection and a pawl or a flexible blade, a vibration pulse being generated by the pawl or the flexible blade striking against the projection as the first rotor passes through the reference angular position.

In a variant embodiment, the first rotor includes an annular element placed around an annular stator portion, the pawl or the flexible blade being located on the inside face of the annular element of the first rotor and the projection being located on the outside face of the annular portion of the stator.

The invention also provides a turbojet including at least one system as described above.

BRIEF DESCRIPTION OF THE DRAWINGS

Other characteristics and advantages of the present invention appear from the following description made with reference to the accompanying drawings that show an embodiment having no limiting character. In the figures.

DETAILED DESCRIPTION OF AN EMBODIMENT

Figure 1:
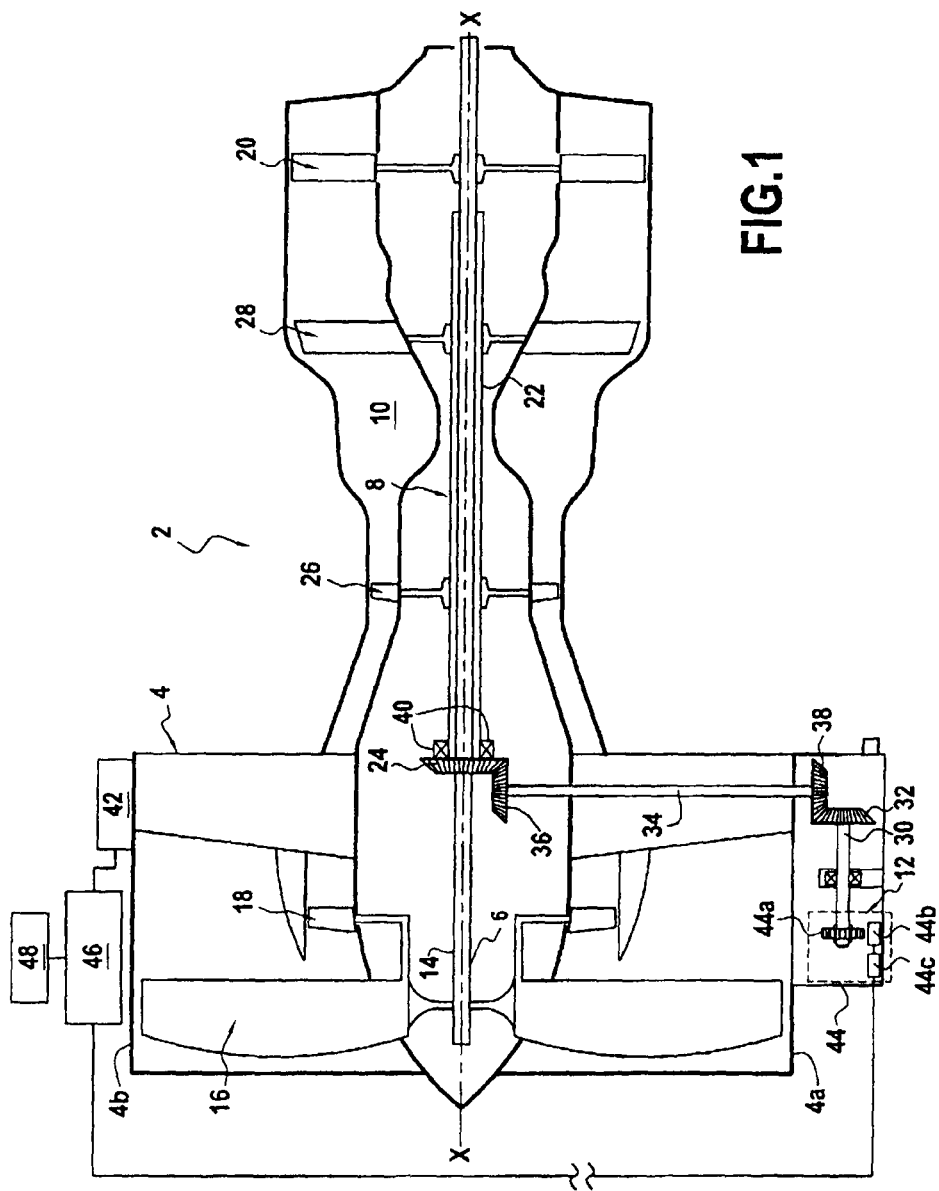
FIG. 1 is a diagrammatic longitudinal section view of a turbojet in accordance with the invention, in a particular embodiment.

FIG. 1 is a fragmentary and diagrammatic view of a two-spool bypass turbojet 2 in which the determination method and system of the invention can be implemented. Naturally, the present invention may also apply to other types of aircraft engine in which it is desired to monitor operations.

In well-known manner, the turbojet 2 of longitudinal axis X-X comprises in particular a fan casing 4, a low pressure spool 6, a high pressure spool 8, a combustion chamber 10, and an accessory gearbox (AGB) 12.

The low pressure spool 6 comprises a low pressure shaft 14 centered on the longitudinal axis X-X, a fan 16 mounted on the front end of the low pressure shaft, a low pressure compressor 18 fastened to the fan, downstream therefrom, and a low pressure turbine 20 mounted at the rear end of the low pressure shaft.

The high pressure spool 8 comprises a high pressure shaft 22 placed concentrically around the low pressure shaft 14, a bevel gear 24 mounted at the front end of the high pressure shaft, a high pressure compressor 26 mounted on the high pressure shaft downstream from the gear 24, and a high pressure turbine 28 mounted on the rear end of the high pressure shaft.

For reasons of clarity, the various compressors and turbines of the low pressure and high pressure spools of the turbojet 2 are represented in FIG. 1 by respective single stages of blades. Naturally, and in well-known manner, each of these elements may comprise several stages of blades.

By way of example, the accessory gearbox 12 is fastened to a bottom face 4a of the fan casing 4. This gearbox 12 includes a so-called "accessory" shaft 30 that carries a bevel gear 32 at its rear end. The shaft 30 of the AGB 12 is driven in rotation by the high pressure shaft 22 by a takeoff shaft 34 having a bevel gear 36 at its top end and a bevel gear 38 at its bottom end.

In the description below, the gear ratio between the high pressure shaft 22 and the accessory shaft 30 is written $\bar{k}$ ($\bar{k}\ne 1$), which means that when the accessory shaft 30 performs one revolution, the high pressure shaft 22 performs $\bar{k}$ revolutions (i.e. the speed of rotation of the high pressure shaft is equal to $\bar{k}$ times the speed of rotation of the accessory shaft 30).

In the example described herein, the angular position of the high pressure shaft 22 of the turbojet 2 (first rotor in the meaning of the invention) is determined from the angular position of the accessory shaft 30 (second rotor in the meaning of the invention) of the AGB. Nevertheless, the invention could equally well be applied to other shafts of the turbojet 2.

In general manner in the invention, the angular position of a rotor is defined by the angular position of a predetermined marker (fixed point) situated on the rotor (e.g. an anti-rotation catch situated on the rotor) relative to an invariant remarkable point.

In accordance with the invention, in order to determine the angular position of the high pressure shaft 22, the turbojet 2 has vibration generator means 40. More precisely, these means 40 are suitable for generating vibration during rotation of the high pressure shaft 22, vibration being generated when the high pressure shaft passes through a particular reference angular position written $\theta_0$ (not shown in FIG. 1). In order to simplify the description, the reference angular position $\theta_0$ corresponds to the invariant remarkable point ($\theta_0=0$), e.g. situated at "twelve o'clock" relative to the longitudinal axis X-X.

An example of the vibration generator means is described below with reference to FIGS. 2A and 2B.

In order to detect the vibration generated by the vibration generator means 40, the turbojet 2 is fitted with a vibration sensor 42, such as an accelerometer or a vibration meter, for example, of known type and not described in greater detail herein. In manner known to the person skilled in the art, the vibration sensor 42 is adapted to generate a vibration signal $S_{vibration}$ representative of the vibration emitted by the vibration generator means 40. It may advantageously be constituted by a vibration sensor that is already in use in the turbojet 2 in order to detect vibrations other than the vibration generated by the means 40, such as for example vibration due to a failure of an engine member such as a ball bearing, to a rupture of a support, or to an unbalance of the rotor. Such a sensor is selected appropriately as a function of its sensitivity and of the amplitude and frequency characteristics of the vibration emitted by the means 40 at various operating speeds of the turbojet.

By way of example, the vibration sensor 42 is placed on a top face 4b of the fan casing 4. In a variant, it may be placed facing or close to the vibration generator means 40, e.g. on the high pressure spool 8.

The turbojet 2 also has a speed sensor 44 suitable for measuring the speed of rotation of the accessory shaft 30 when it is driven by the high pressure shaft 22. Such a speed sensor is itself known and is described in particular in document U.S. Pat. No. 4,075,562. In the example described herein, the speed sensor is constituted in particular by:
- a toothed wheel 44a centered on the axis of the accessory shaft 30 (and constrained to rotate therewith) and having teeth that are spaced apart in the example described at a constant angle $\alpha$, which teeth are covered in or made of a magnetic material;
- a magnetic sensor 44b fitted with an induction coil mounted facing the toothed wheel 44a; and
- a conditioning circuit 44c connected to the magnetic sensor 44b.

In known manner, during rotation of the toothed wheel 44a (i.e. during rotation of the accessory shaft 30), the passage of the teeth of the wheel that are covered in (or made of) magnetic material excites the induction coil of the magnetic sensor 44b and generates an electric signal (e.g. an electric current) at a frequency that is proportional to the speed of rotation of the wheel. This electric signal is transformed by the conditioning circuit 44c into a pseudo-periodic signal $S_{wheel}$ of sinusoidal shape with the "peaks" of the sinewave (each peak corresponding to one period of the sinewave) representing the passage of the various teeth of the wheel past the magnetic sensor 44b. Thus, by observing the signal $S_{wheel}$, it is possible to count the number of teeth $N(t)$ (i.e. the number of sinewave peaks) that have gone past the magnetic sensor 44b at a given instant t relative to a reference instant $t_0$, and then to determine, using the angle $\alpha$ between the teeth of the toothed wheel, the angular position of the accessory shaft 30 at said instant t relative to its angular position at the reference instant $\theta_{30}(t_0)$.

In addition, the turbojet 2 includes a calculation device 46 suitable for determining the angular position of the high pressure shaft 22. This calculation device 46 includes a memory 48 and it is connected firstly to the vibration sensor 42 and secondly to the speed sensor 44.

Figure 3:
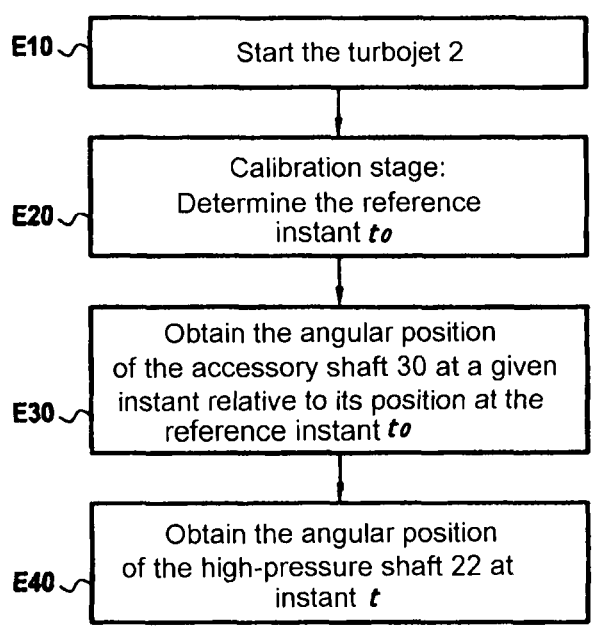
FIG. 3 is a flow chart showing the main steps implemented in the determination method of the invention, in a particular implementation.

With reference to FIG. 3 there follows a description of the main steps of the determination method of the invention when implemented in the turbojet 2 to determine the angular position of the high pressure shaft 22 at a given instant.

For this purpose, in a particular embodiment of the invention, use is made firstly of the signal $S_{wheel}$ representative of the angular position of the accessory shaft 30 as a function of time, and secondly of a reference instant $t_0$ corresponding to the high pressure shaft 22 passing through the reference angular position $\theta_0$ (i.e. such that $\theta_{22}(t_0)=\theta_0$ (=0 in this example)) that coincides with a tooth of the toothed wheel 44a going past the magnetic sensor 44b.

After the turbojet has started (step 310), this reference instant $t_0$ is determined during a calibration stage (step E20) that is described in detail below with reference to FIG. 4.

The angular position of the accessory shaft 30 relative to its position at the reference instant $t_0$ (i.e. $\theta_{30}(t)-\theta_{30}(t_0)$) may then be obtained at an arbitrary instant t using the signal $S_{wheel}$ delivered by the speed sensor 44, as mentioned above (step 30). For this purpose, the calculation device 46 evaluates the number $N(t)$ of teeth that have gone past the magnetic sensor 44b at the instant t by counting the number of sinewave peaks in the signal $S_{wheel}$ between the reference instant $t_0$ and the instant t. For this purpose, the calculation device 46 may in particular make use of a counter CPT (not shown in FIG. 1) that is advantageously initialized at the reference instant $t_0$, and that is incremented on each new sinewave peak identified in the signal $S_{wheel}$ delivered by the speed sensor 44.

For implementation reasons, this counter may also be initialized to zero after a predetermined integer number m ($m \geq 1$) of revolutions performed by the high pressure shaft 22. It is detected that the high pressure shaft has performed m revolutions by comparing the value of the counter CPT (i.e. the number of sinewave peaks identified in the signal $S_{wheel}$) with a theoretical number of peaks corresponding to m revolutions of the high pressure shaft and calculated using the gear ratio k.

The angular position of the accessory shaft relative to its position at the reference instant $t_0$ is then obtained using the following equation (Eq. 1):

$$\theta_{30}(t)-\theta_{30}(t_0)=\alpha N(t) \quad\quad (Eq. 1)$$

Since the high pressure shaft and the accessory shaft are in random angular positions relative to the reference point when the turbojet starts, knowledge of the angular position of the high pressure shaft at the reference instant $t_0$ makes it possible to deduce its angular position at an arbitrary given instant t from the angular position of the accessory shaft at the same instant. Thus, starting from the value $\theta_{22}(t_0)$ and the angular position of the accessory shaft 30 relative to its position at the reference instant $t_0$, the calculation device 46 determines the angular position $\theta_{22}(t)$ of the high pressure shaft at a given instant t, in step E40 using the equation below (Eq. 2):

$$\begin{aligned}\theta_{22}(t) &= \theta_{22}(t_0) + k[\theta_{30}(t) - \theta_{30}(t_0)] \\ &= \theta_0 + k[\theta_{30}(t) - \theta_{30}(t_0)]\end{aligned} \quad (Eq. 2)$$

i.e. in the example described herein, after combining it with the equation (Eq. 1):

$$\theta_{22}(t)=k[\theta_{30}(t)-\theta_{30}(t_0)]=k\alpha N(t) \quad\quad (Eq. 3)$$

Figure 4:
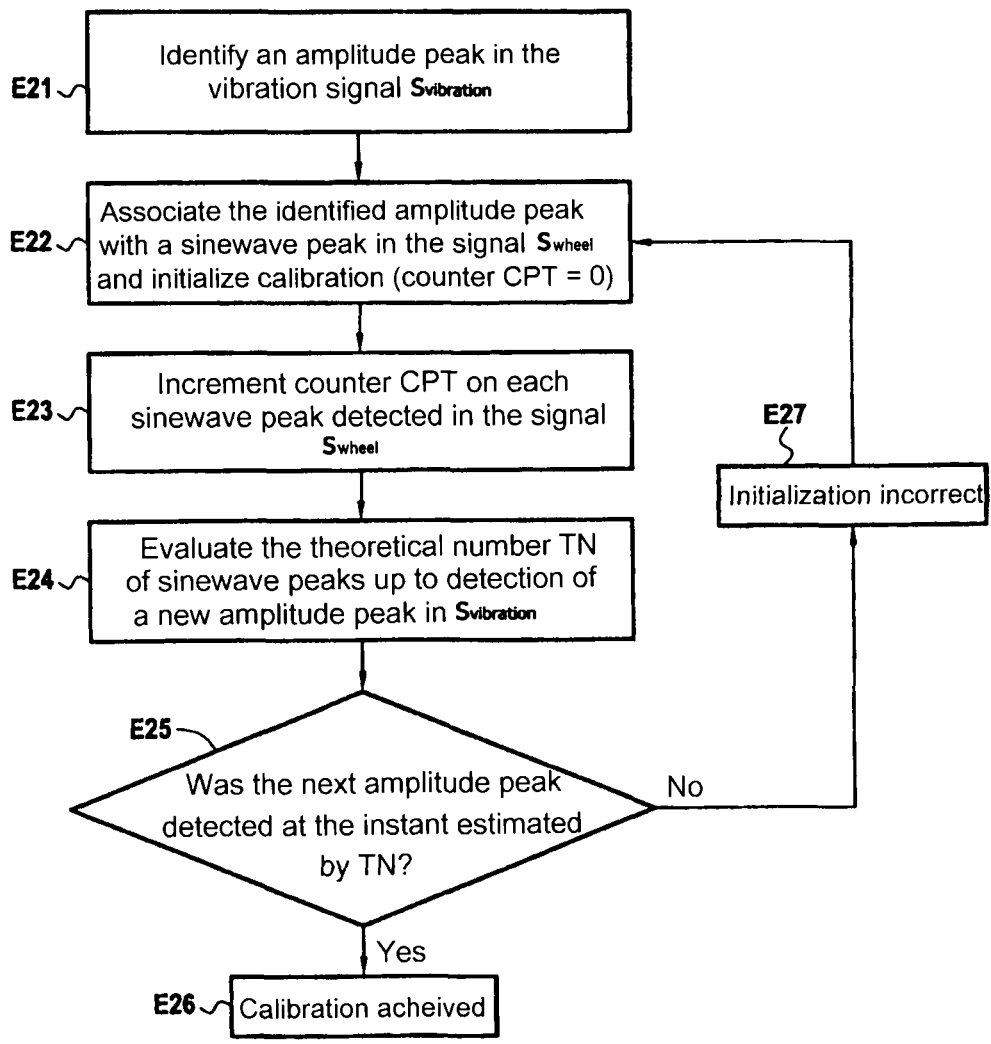
FIG. 4 shows the main steps implemented in a calibration stage in order to determine a reference instant to in a particular implementation of the invention.

With reference to FIG. 4, there follows a detailed description of the main steps implemented during the calibration stage (step E20) for determining the reference instant $t_0$. This reference instant itself constitutes a time reference that is common to the high pressure shaft 22 and to the accessory shaft 30, i.e. a reference enabling the angular position of one of them to be deduced relative to the other by means of the equation (Eq. 3) without necessarily having any knowledge of their respective initial positions.

Advantageously, in the presently-described embodiment, the reference instant $t_0$ is selected so that the detection of vibration emitted by the vibration generator means 40 coincides in time with the detection of a tooth of the toothed wheel 44a going past the magnetic sensor 44b of the speed sensor. The following steps are then implemented during the calibration stage in order to determine this reference instant.

When the turbojet 2 is started, the high pressure shaft 22 is set into rotation and drives the accessory shaft 30 via the takeoff shaft 34. While the turbojet is operating at low speed, the vibration generator means 40 generate a vibration pulse each time the high pressure shaft 22 passes through the reference angular position $\theta_0$. By way of example, this vibration pulse may be generated as a result of a pawl striking a projection, as described below with reference to FIGS. 2A and 2B.

Each vibration pulse as generated in this way is subsequently detected by the vibration sensor 42 which then delivers a vibration signal $S_{vibration}$ representative of this vibration to the calculation device 46. In known manner, vibration is characterized by an amplitude and a frequency (or angular frequency). Thus, the vibration generated by the vibration generator means 40 corresponds to a particular range of amplitudes A at a frequency that corresponds to the speed of rotation of the turbojet (low speed at this stage).

In the signal $S_{vibration}$, the calculation device 46 identifies the amplitude peak(s) corresponding to the vibration pulse(s) generated by the vibration generator means 40 (step E21). For this purpose, the amplitude of the vibration signal is compared with a predetermined threshold corresponding to the vibration generated by the vibration generator means 40 (above-mentioned amplitude range A). During rotation of the high pressure shaft 22, such an amplitude peak appears cyclically in the vibration signal (one peak for each vibration pulse generator), at a frequency that corresponds to the speed of rotation of the turbojet.

Thereafter, the calculation device 46 associates a previously-identified amplitude peak in the signal $S_{vibration}$ with a sinewave peak in the signal $S_{wheel}$ (step E22) that corresponds in time to said amplitude peak. If the amplitude peak is not synchronized with a sinewave peak, then the calculation device associates therewith the sinewave peak in the signal $S_{wheel}$ that is the next following peak. In other words, the sinewave peak represents the instant at which the vibration pulse generated by the vibration generator means 40 was detected with precision determined by the number of peaks of the toothed wheel and by the gear ratio k. Once this association step has been performed, it is considered that calibration has been initialized.

The calculation device 46 then counts the sinewave peaks in the signal $S_{wheel}$ following the sinewave peak associated with the amplitude peak (step E23) and continues to do so until a new amplitude peak is detected in the signal $S_{vibration}$ corresponding to a new vibration pulse being generated by the vibration generator means 40. For this purpose, it is possible to use the counter CPT, for example, the counter being initialized to zero each time a sinewave peak is associated with an amplitude peak (i.e. on each initialization of the calibration stage) and incremented on each sinewave peak detected in the signal $S_{wheel}$.

On the basis of the number of teeth of the toothed wheel and of the gear ratio k, the calculation device 46 also evaluates (step E24) the theoretical number TN of sinewave peaks that ought to be observed between the sinewave peaks associated with the amplitude peaks and the sinewave peaks that ought to be associated with the next expected vibration pulse. This theoretical number TN provides an estimate of the instant (i.e. sinewave peak) at which the next amplitude peak corresponding to the next vibration pulse generated by the means 40 is expected.

If the next amplitude peak in the signal $S_{vibration}$ is indeed detected at that instant (test E25), then calibration has been completed (step E26). The instant corresponding to the sinewave peak associated with the preceding amplitude peak (i.e. the amplitude peak identified in step E21) is considered as being the reference instant $t_0$. From that moment on, the sinewave peaks N(t) are tracked continuously using the counter, and this continues throughout the duration of turbojet operation. As a result, it is possible to associate any future event with a sinewave peak in the signal $S_{wheel}$ and a value N(t) of the counter, and thus to know the angular position of the high pressure shaft 22 at the instant the event was detected.

If the next amplitude peak in the signal $S_{vibration}$ is not detected at the expected instant, then initialization is considered as being incorrect (step E27). Calibration is restarted from this amplitude peak, and steps E22 to E27 are repeated until the reference instant $t_0$ has been identified.

In a variant, calibration may be performed over a plurality of revolutions.

The calibration stage is preferably of short duration and is performed when the turbojet is started, while the turbojet is operating at low speed (i.e. below some particular speed of rotation of the high pressure shaft, for example).

In particularly advantageous manner, the invention thus makes it possible, e.g. on the vibration sensor detecting an unbalance of the turbojet (which sensor may be the vibration sensor 42), to determine the angular position of the high pressure shaft at the moment of detection.

On detecting an unbalance at a given instant, the reading of the counter CPT makes it possible using the equation (Eq. 3) to deduce the angular position of the high pressure shaft 22 at that instant. The angular position of the unbalance is thus determined from said angular position of the high pressure shaft 22 and from the known angular difference that exists between the vibration sensor used for detecting the unbalance and the vibration generator means 40.

The angular position of the unbalance as determined in this way can then be stored in the memory 48 of the calculation device 46. It can be used subsequently to identify the location on the high pressure shaft 22 of the failure that gave rise to the unbalance and to correct said failure during a maintenance operation.

Figure 2A:
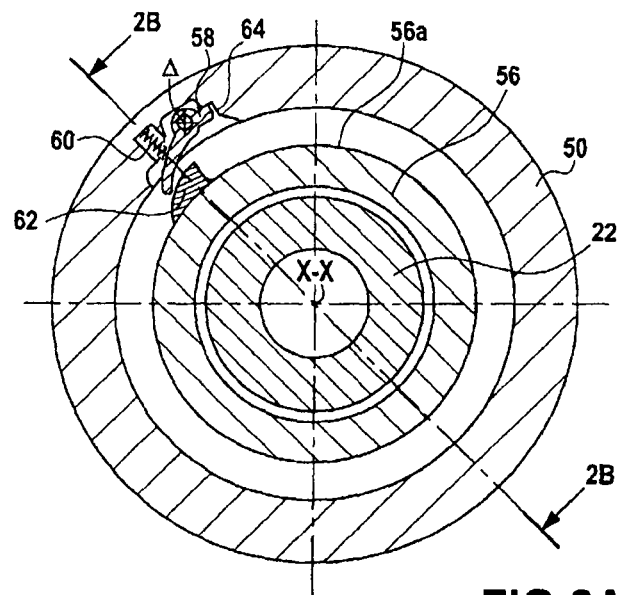
FIGS. 2A and 2B are diagrammatic section views of vibration generator means suitable for use in a particular embodiment of the invention.
Figure 2B:
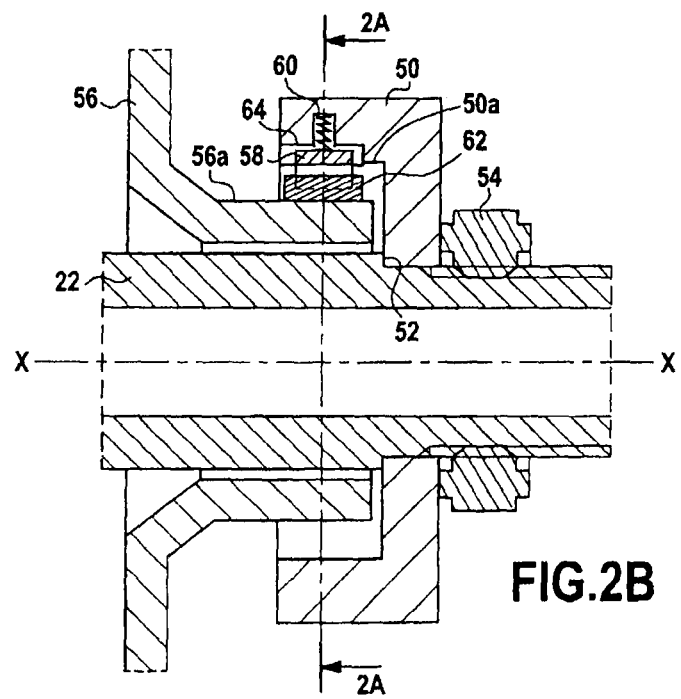

With reference to FIGS. 2A and 2B there follows a description of an example of vibration generator means 40 suitable for implementing the invention.

In this example, the high pressure shaft 22 includes an annular element 50 centered on the longitudinal axis X-X of the turbojet 2 and secured to the shaft at one end by an abutment 52 and at the other end by a nut 54 screwed onto the shaft. The angular element 50 is placed concentrically around an annular stator portion 56 and on its inside face 50a it includes a spring-biased pawl 58. The annular portion of the stator 56 includes a projection 62 on its outside face 56a.

The pawl 58 may pivot about an axis A parallel to the axis X-X and it is coupled to a spring 60. The rest position of the spring 60 is such that the pawl 58 strikes against the projection 62 each time the high pressure shaft 22 passes through the reference position $\theta_0$. The impact of the pawl 58 against the projection 62 thus generates a vibration pulse.

The annular element 50 of the high pressure shaft 22 also includes a cavity 64 in which the pawl 58 can be received after impacting against the projection 62 prior to being repositioned under the return force from the spring 60.

Also advantageously, the pawl 58 may be received in this cavity 64 under the effect of the centrifugal force that is associated with the shaft 22 rotating, i.e. once this centrifugal force is greater than the return force of the spring 60. As a result, vibration pulses are generated by the vibration generator means 40 only during the stage in which the turbojet 2 is starting (corresponding to operating at low speed). The above-described calibration stage is preferably performed during this starting stage. Starting from a particular speed of operation of the turbojet 2 (at which the centrifugal force due to the rotation is greater than the return force of the spring 60), a "declutching" effect occurs, i.e. the spring-biased pawl 58 becomes received in the cavity 64 so that it no longer strikes against the projection 62 and no longer generates a vibration pulse each time the high pressure shaft passes through the reference position $\theta_0$. This avoids wear of the vibration generator means 40 and a fortiori this avoids breakdowns that would result from such wear.

In this example, the vibration generator means 40 are implemented using a spring-biased pawl. Nevertheless, it is possible to use other types of device in order to produce a similar effect, such as for example a flexible blade or a ball pawl.

The invention claimed is:

1. A method of determining the angular position of a first rotor of a turbojet, the method comprising:
    generating at least one vibration pulse during a rotation of the first rotor, each vibration pulse being generated when the first rotor passes through a given reference angular position;
    detecting the vibration generated thereby;
    obtaining the angular position at a given instant of a second rotor of the turbojet relative to the angular position that it occupied at a reference instant representative of detecting a vibration pulse, said second rotor being coupled in rotation with the first rotor and having a speed of rotation different from the speed of rotation thereof; and
    determining from the angular position of the second rotor, the angular position of the first rotor at said given instant.

2. A method according to claim 1, wherein the angular position of the second rotor is obtained from a signal delivered by a sensor and representative of the teeth of a toothed wheel that is positioned on the second rotor going past the sensor.

3. A method according to claim 2, wherein the instant representative of detecting a vibration pulse is selected as an instant at which the passage of the first rotor through the reference position coincides with a tooth of the toothed wheel going past the sensor.

4. A method of determining the angular position of an unbalance that is detected at a given instant on a first rotor of a turbojet, the turbojet also including a second rotor coupled in rotation with the first rotor and having a speed of rotation that is different from the speed of rotation thereof, said method comprising:
    determining the angular position of the first rotor at the instant at which the unbalance was detected, as a function of the angular position of the second rotor by using a method of determining angular position according to any one of claims 1 to 3; and
    determining the angular position of the unbalance at said instant from the angular position of the first rotor.

5. A system for determining the angular position of a first rotor of a turbojet, the system comprising:
    means for generating vibration during a rotation of the first rotor, each vibration pulse being generated on the first rotor passing through a given reference angular position;
    means for detecting the generated vibration pulses;
    means for obtaining an annular position at a given instant of a second rotor of the turbojet relative to the angular position it occupied at a reference instant representative of a vibration pulse being detected, said second rotor being coupled to rotate with said first rotor and having a speed of rotation that is different from the speed of rotation thereof; and
    means for determining the angular position of the first rotor at said given instant on the basis of the angular position of the second rotor.

6. A system according to claim 5, wherein the means for generating vibration are adapted to cease generating vibration on the first rotor passing through the reference angular position as from a particular speed of operation of the turbojet.

7. A system according to claim 5 or claim 6, wherein the means for generating vibration comprise a projection and a pawl or a flexible blade, a vibration pulse being generated by the pawl or the flexible blade striking against the projection as the first rotor passes through the reference angular position.

8. A system according to claim 7, wherein the first rotor includes an annular element placed around an annular stator portion, the pawl or the flexible blade being located on the inside face of the annular element of the first rotor and the projection being located on the outside face of the annular portion of the stator.

9. A system according to claim 5, wherein the first rotor is the high pressure shaft of the turbojet and the second rotor is a shaft connected to an accessory gearbox.

10. A turbojet comprising at least one system according to claim 5.

* * * * *